(12) United States Patent
Lawrence et al.

(10) Patent No.: US 7,333,053 B2
(45) Date of Patent: Feb. 19, 2008

(54) SIGNAL PATH SYSTEM AND METHOD FOR A RANGING SIGNAL RECEIVER

(75) Inventors: David G. Lawrence, Mountain View, CA (US); H. Stewart Cobb, Palo Alto, CA (US)

(73) Assignee: Novariant Inc., Fremont, CA (US)

( * ) Notice: Subject to any disclaimer, the term of this patent is extended or adjusted under 35 U.S.C. 154(b) by 224 days.

(21) Appl. No.: 10/836,363

(22) Filed: Apr. 29, 2004

(65) Prior Publication Data

US 2005/0242990 A1  Nov. 3, 2005

(51) Int. Cl.
*G01S 5/14* (2006.01)

(52) U.S. Cl. .............................. 342/357.04; 342/357.12

(58) Field of Classification Search ........... 342/357.12, 342/357.04
See application file for complete search history.

(56) References Cited

U.S. PATENT DOCUMENTS

| | | | | |
|---|---|---|---|---|
| 4,485,383 A | * | 11/1984 | Maher ........................ | 342/352 |
| 4,928,106 A | * | 5/1990 | Ashjaee et al. ............. | 342/352 |
| 5,347,284 A | * | 9/1994 | Volpi et al. ................. | 342/356 |
| 5,678,169 A | * | 10/1997 | Turney .......................... | 455/1 |
| 5,805,108 A | * | 9/1998 | Lennen .................. | 342/357.12 |
| 6,016,121 A | * | 1/2000 | Bogensberger et al. | 342/357.12 |
| 6,097,974 A | * | 8/2000 | Camp et al. ............. | 455/575.7 |
| 6,351,236 B1 | * | 2/2002 | Hasler .................... | 342/357.09 |
| 6,359,940 B1 | * | 3/2002 | Ciccarelli et al. ........... | 375/316 |
| 6,448,926 B1 | * | 9/2002 | Weinberg et al. ...... | 342/357.06 |
| 6,549,165 B2 | | 4/2003 | Neira et al. | |
| 6,584,304 B1 | * | 6/2003 | Thomsen et al. ........ | 455/188.1 |
| 6,675,003 B1 | * | 1/2004 | Dubash et al. .............. | 455/302 |
| 2001/0002822 A1 | * | 6/2001 | Watters et al. ........... | 342/357.1 |
| 2003/0069036 A1 | * | 4/2003 | Forrester .................... | 455/552 |
| 2006/0152408 A1 | * | 7/2006 | Leinonen et al. ...... | 342/357.12 |

FOREIGN PATENT DOCUMENTS

EP   WO 03/044556 A2   5/2003

OTHER PUBLICATIONS

Thor, Jonas et al, "A Direct RF Sampling Multifrequency GPS Receiver," IEEE 2002, pp. 44-51.*

Akos, Dennis et al, "A Prototyping Platform for Multi-Frequency GNSS Receivers," Presented at ION GPS/GNSS Meeting, Sep. 2003.*

(Continued)

*Primary Examiner*—Gregory C Issing
(74) *Attorney, Agent, or Firm*—Brinks, Hofer, Gilson & Lione

(57) ABSTRACT

Methods and receivers determine a range from radio frequency ranging signals at multiple frequencies. The number of dedicated RF sections and correlation processing power is reduced by multiplexing signals from a sub-set of frequencies onto a common path. The common path provides shared processing, such as down-conversion shared by signals at two different frequencies. The correlation processing power for a three frequency receiver may be the same or similar as for a two frequency receiver since signals for two frequencies share processing as a function of time. Correlation is performed intermittently for signals at two of the frequencies.

26 Claims, 2 Drawing Sheets

OTHER PUBLICATIONS

De Jong, K. "Future GPS and Galileo Signals; Unprecedented Accuracy and Availability," Geoinformatics, Sep. 2002.*
Fontana, Richard et al, "The Modernized L2 Civil Signal: Leaping Forward in the 21st Century," GPS World, Sep. 2001.*

"Optimum Semi-Codeless Carrier Phase Tracking of L2," by K.T. Woo; Presented at the 12th International Technical Meeting of the Satellite Division of the Institute of Navigation, Nashville, Tennessee, Sep. 14-17, 1999.

* cited by examiner

SIGNAL PATH SYSTEM AND METHOD FOR A RANGING SIGNAL RECEIVER

BACKGROUND

The present invention relates to navigation systems. In particular, a receiver for correlating ranging signals at different frequencies uses a common structure.

The Global Positioning System (GPS) is a satellite based navigation system having a constellation of 24 Earth orbiting satellites. These satellites are approximately uniformly dispersed around six circular orbits having four satellites each. Theoretically, four or more GPS satellites are visible from most points on the Earth's surface.

Each GPS satellite presently transmits at two frequencies: L1 (1575.42 MHz) and L2 (1227.60 MHz). There exists provision (for the future) for a third frequency L5 (1176.45 MHz) as well. The L1 frequency has two different spread-spectrum codes modulated on it: a coarse acquisition (C/A) code and a Y code. The C/A code is an unclassified code intended for civilian navigation. It has a chipping rate of 1.023 MHz and a sequence length of 1023 chips. The Y code is a classified unknown code than includes a P code. Both C/A and P codes are unique for each satellite.

GPS receivers are commonly used for a variety of applications involving tracking of the position of various objects. The object to be tracked is coupled to one or more GPS antennas that receive signals from the GPS satellites. A commonly used method that yields position information (within meters) is the pseudorange method. This method utilizes the C/A code and/or the P code modulated onto the carrier signals from the GPS satellites. In another method for more accurate positioning, a reference antenna employs carrier phase measurements and has known coordinates. Differential carrier phase GPS measurement is a technique which determines the position of a given antenna with respect to the reference antenna. The other antennas, known as roving antennas, are free to roam around. Measurements of the carrier phase at the reference antenna and the roving antennas are used to calculate the relative position of the antennas to centimeter level accuracy.

To determine position accurately, the carrier cycle ambiguity or the number of complete carrier cycles between the antennas (reference antenna and roving antennas) is determined. Dual frequency receivers that utilize both L1 and L2 frequency signals can determine carrier cycle ambiguities faster than a single frequency receiver. The phase of the L2 carrier is used to assist in resolving the carrier cycle ambiguity of the L1 signals.

Typically, GPS receivers employ dedicated RF sections for both the L1 and the L2 frequencies for every antenna to be tracked. The RF sections down convert respective L1 and/or L2 RF signals and sample the signals for further processing. However, each additional dedicated RF section adds costs. For a receiver operable with L5 signals, additional cost is added. Tracking L1, L2 and L5 may result in use of correlators with increased power as compared to an L1 and L2 receiver.

BRIEF SUMMARY

The present invention is defined by the following claims, and nothing in this section should be taken as a limitation on those claims. By way of introduction, the preferred embodiments described below include a method and receivers for determining a range from radio frequency ranging signals at multiple frequencies. The number of dedicated RF sections and correlation processing power is reduced by multiplexing signals from a sub-set of frequencies onto a common path. The common path provides shared processing, such as down-conversion shared by signals at two different frequencies. The correlation processing power for a three frequency receiver may be the same or similar as for a two frequency receiver since signals for two frequencies share an input as a function of time. Correlation is performed intermittently for signals at two of the frequencies.

In a first aspect, a navigation receiver is provided for determining a range from radio frequency ranging signals. At least two different signal paths each output a different frequency band of the radio frequency ranging signals. A common path connects with outputs of both of the at least two different paths.

In a second aspect, an improvement in a satellite navigation receiver for determining a range with radio frequency ranging signals at three different frequencies from a same satellite is provided. The improvement is a first down-converter path common to at least two of the three different frequencies.

In a third aspect, a method is provided for receiving signals to determine a range. Coded signals are filtered into at least two different frequency bands. The coded signals at the at least two different frequency bands are placed in an alternating sequence onto a common path.

In a fourth aspect, a navigation receiver is provided for determining a range from radio frequency ranging signals. A correlator is operable in at least first and second modes, the first mode using a first unique correlation logic and the second mode using a second unique correlation logic, where the first unique correlation logic is different than the second unique correlation logic.

In a fifth aspect, a method is provided for receiving signals to determine a range. Coded signals are separated into at least two different frequency bands. A correlator is operated with at least two different correlation logic modes at different times, a first correlation logic mode for a first of the at least two different frequency bands and a second correlation logic mode for a second of the at least two different frequency bands.

Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The present invention provides a measurement system and an associated method for 'tracking an object' (or a number of objects). The phrase 'tracking an object' includes finding position, and sometimes velocity, time, attitude and/or angular velocity associated with the object as well.

Tracking is performed by determining one or more ranges from radio frequency ranging signals. For the purpose of tracking the object, the object is coupled to the measurement system. The measurement system comprises one or more antennas that are connected to the object so that the object may be tracked. For some applications, it may be desirable to track the position of an object with respect to the position of another object. For example, for a farm tractor pulling a field implement, the antennas may be mounted both on the farm tractor as well as the field implement. Here, it is desirable to know the position of the antenna mounted on the tractor relative to the position of the antenna mounted on the field implement. The antennas receive radio frequency (RF) ranging signals from at least one signal generating sources: satellites or pseudolite. A pseudolite (pseudo satellite) is a low power transmitter that transmits an RF ranging signal, such as at the L1 RF frequency.

The RF ranging signals received by the antenna comprise a primary frequency RF signal and at least one secondary frequency RF signal from the same source. If there are more than one secondary frequency RF signals, each secondary frequency RF signal propagates through space at a different frequency. A common processing path is provided for the secondary frequencies from a same source.

Figure 1:
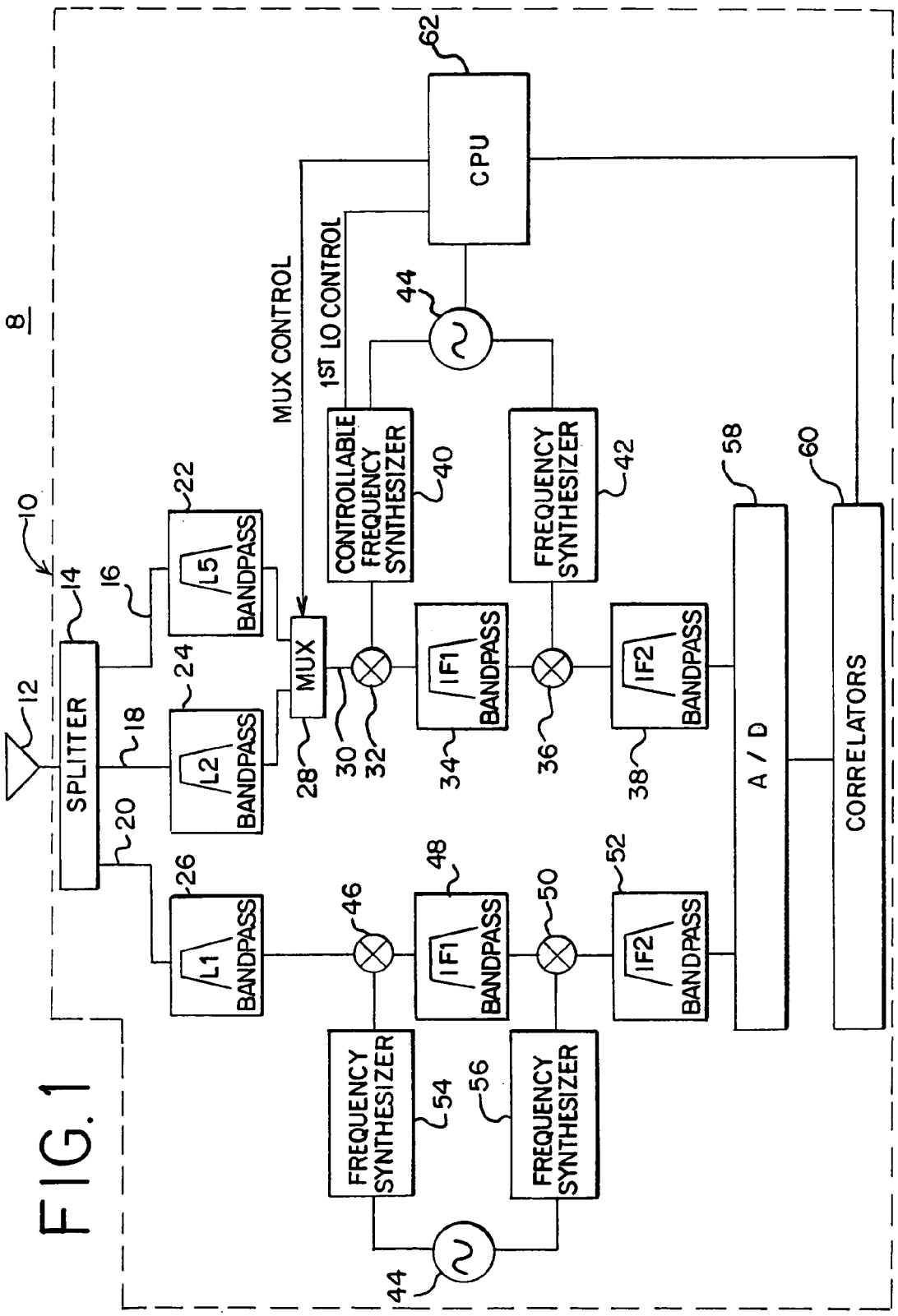
FIG. 1 is a block diagram of one embodiment of a navigation receiver.

FIG. 1 shows one embodiment of a navigation system 8 for determining a range from radio frequency ranging signals. The receiver is operable to determine a range with radio frequency ranging signals at two, three or more different frequencies from a same source, such as a same satellite or pseudolite. In one embodiment, the system 8 includes a Global Positioning System (GPS) receiver. The sources for the GPS each transmit at two or more frequencies, such as the L1, L2 and L5 frequencies. The system 8 is applicable to any positioning system, although exemplary embodiments below are illustrated with respect to the GPS. The system 8 may alternatively be used in other positioning systems, including Global Orbiting Navigation Satellite System (GLONASS), Europe's Galileo navigation system, pseudolite augmented systems, or any other positioning system that emits RF signals for tracking an object. The object may be mobile or stationary, such as but not limited to a vehicle, a pole, an aircraft, a ship, a boat, or a train.

The system 8 includes an antenna 12 and a receiver 10. The receiver 10 includes an RF splitter 14, three frequency paths 16, 18 and 20 connected with the RF splitter 14, a multiplexer 28, a common path 30 connected with two of the three frequency paths 16, 18, a clock 44, an analog-to-digital converter 58, a correlator 60 and a processor 62. Additional, different or fewer components may be used, such as providing only two frequency paths 16 and 18.

The antenna 12 is a multiple frequency antenna, such as two, three or more antennas sized and shaped for reception of ranging signals at different frequencies while minimizing reception of bounced or reflected signals. Quad helix, aerial, linear, patch, ring, combinations thereof or other now known or later developed antenna may be used. For example, three patch antennas are layered for receiving signals at L1, L2 and L5 RF frequencies, respectively. The L1 RF signal is the primary frequency RF signal and the L2 and the L5 RF signals are the secondary frequency RF signals. Alternatively, L5 is used as the primary frequency signal. In yet another alternative embodiment, L2 is used as the primary frequency signal, such as in a military application.

The antenna 12 connects with the different frequency paths 16, 18 and 20 through the RF splitter 14. Alternatively, each patch or other antenna connects separately to a respective frequency path 16, 18 and 20. The antenna 12 is operable for receiving signals from a single satellite, such as by the codes or other processing applied to the signals received by the antenna 12. In other embodiments, multiple antennas are provided for receiving signals from a respective multiple satellites and/or pseudolites for determining position. Various position tracking algorithms exist in the art for tracking positions of multiple antennas using less than four satellites.

RF signals received by the antenna 12 are amplified, filtered and passed on to the RF splitter 14. The RF splitter 14 separates the power of the RF signal and outputs the same signal to the different frequency paths 16, 18 and 20.

The frequency paths 16, 18 and 20 are analog paths operable for the RF ranging signals at different frequencies. Alternatively, digital paths are used. Each frequency path 16, 18 and 20 is dedicated to a different frequency and comprises a bandpass filter 22, 24 and 26, respectively, but low pass, high pass and combinations thereof may be used. The bandpass filters 22, 24 and 26 are connected in parallel and have different pass bands. For example, the bandpass filter 26 of one frequency path 20 is dedicated to the L1 RF signals from antenna 12. The pass bands of the other bandpass filters 22 and 24 are dedicated to L2 and L5 frequencies. The bandpass filters 22, 24 and 26 filter the RF signals to isolate RF signals at the desired frequency band. For civilian applications, the bandpass filter 26 has a bandwidth of 2 MHz, but other bandwidths may be used. In another variation, a wide-band 20 MHz bandpass filter 26 is used. The bandpass filters 22, 24 and 26 of each frequency path 16, 18 and 20 have a same or different pass bandwidth, spectral pass band shape and/or filter structure.

In one embodiment, one of the frequency paths 20 is separate from the other frequency paths 16 and 18 between the RF splitter and the analog-to-digital converter 50, correlator 60 or processor 62. The other frequency paths 16 and 18 output to the common path 30. For example, the separate frequency path 20 operates on signals at the L1 or L5 frequencies. The other frequency paths operate on L2 signals and the other of the L1 and L5 frequency signals.

The other frequency paths 16 and 18 connect with the common path 30 through the multiplexer 28. The multiplexer 28 includes a transistor, switch, relay, processor, combinations thereof or other now known or later developed devices for combining two or more inputs onto a fewer number of outputs. The multiplexer 28 is operable to multiplex outputs from two or more frequency paths 22 and 24 as a function of time onto the common path 30. The multiplexer 28 switches between the frequency paths 16 and 18. The switching is controlled as a function of time to switch signals from the different frequency paths 16 and 18 into different time slots. For this purpose, the processor 62 or other controller controls the multiplexer 28. In an alternate embodiment, the multiplexer 28 switches according to pre-configured times. The multiplexer 28 outputs RF signals at a particular isolated frequency band, such as outputting L2 and L5 signals at different times. In alternative embodiments, frequency or other multiplexing is used. By multiplexing, a fewer number of down-converters or other devices for a greater number of frequency paths or RF signal frequencies are provided.

The common path 30 is a down-converter path for down converting RF signals from two different frequency paths 16, 18 as a function of time. The common path 30 is an RF section of a navigation receiver shared by signals at received frequencies in two different bands, such as the L2 and L5 signals. In one embodiment, the common path 30 is an analog path having one or more down converters and bandpass filters 34, 38. For example, a pair of mixers 32 and 36 and associated frequency synthesizers 40 and 42 form a respective pair of down converters. Additional, different or fewer components may be provided, such as providing a single down converter formed by the mixer 32 and a frequency synthesizer 40 without additional components or with only one bandpass filter 34. In alternative embodiments, the common path 30 includes different or additional components of an RF section for use with RF signals from two different frequency bands of interest.

The common path 30 connects with the output of two different frequency paths 16 and 18 as output by the multiplexer 28. In alternative embodiments, the common path 30 connects with the antenna 12 directly or indirectly for operating on RF signals including multiple frequency bands of interest. For example, the common path 30 is provided without separate frequency paths 16 and 18. The down converter and/or subsequent or preceding bandpass filter 34 or a combination of filters 22 and 24 are adjusted or altered as a function of time to isolate the RF signals at a desired frequency band for any given time. By switching the down conversion and filtering processes, different ones of the multiple frequencies of interest may be isolated as a function of time.

The mixer 32 is a multiplier, analog circuit, digital circuit or combinations thereof. The frequency synthesizer 40 includes one or more phased lock loops. Where one phased lock loop is provided, a component of the phased lock loop is adjustable to select a different frequency. In response to an output from an oscillator or clock 44, the frequency synthesizer generates a local oscillation signal. The processor 62 controls selection of the desired local oscillation signal.

A different local oscillation signal is generated for a different desired frequency band of interest. The down converter is operable in response to different local oscillation signals. For example, the signals on the common path 30 are mixed by the mixer 32 with a local oscillation signal output by the frequency synthesizer 40. A different local oscillation signal is generated depending on whether the signals being mixed are L1, L2 or L5 signals. The local oscillation frequency is selected to down convert the signals from different frequency bands to a common intermediate frequency band. As an alternative to processor control, the frequency synthesizer 40 operates in response to a same control-signal as the multiplexer 28 in a predetermined pattern of selecting signals of desired frequency. The different local oscillation signals are output at different times to the mixer 32. Where the frequencies of interest sharing the common path 30 are L5 and L2 or L5 and L1, the local oscillation signal is selected as appropriate for the desired frequency bands to provide a common intermediate frequency. In response to the selected local oscillation signal, the mixer 32 down converts the input RF signals to the substantially common intermediate frequency. Substantially is used herein to provide for tolerances in circuit implementation, tolerances in manufacture, and selection of local oscillation frequencies that result in similar but not identical intermediate frequencies. Any common intermediate frequency may be used.

The further band pass filter 34 sharpens the bandpass of the signals while passing or maintaining the RF signals at the desired intermediate frequency without reducing coded content. The further down converter provided by the mixer 36 and frequency synthesizer 42 further down converts the intermediate frequency to a frequency appropriate for later digital processing. For example, the intermediate frequency signals are further reduced to about 4 MHz or other intermediate frequency. The band pass filter 38 sharpens the bandpass of the signals while maintaining the coded information in the intermediate or further intermediate frequency signals.

The dedicated frequency path 20 separate from the common path 30 is a dedicated RF section in one embodiment. For example, the frequency path 20 includes one or more band pass filters 26, 58 and 52, a pair of down converters formed by two mixers 46, 50 and two frequency synthesizers 54 and 56. Additional, different or fewer components may be provided. The down converter formed by the mixer 46 and the frequency synthesizer 54 is in parallel to the down converter path provided on the common path 30. The down converter of the dedicated frequency path 20 down converts the radio frequency signals at the isolated or desired frequency band to an intermediate frequency, such as down converting L1 frequency band signals to 175 Megahertz or another value. The frequency synthesizer 54 is a phased lock loop or other component for generating a local oscillation signal appropriate for mixing by the mixer 46. The frequency synthesizer 54 is responsive to the same clock 44 as the common path 30. While shown as separate local oscillators in FIG. 1, the clock 44 is preferably the same device. The band pass filter 48 filters at the intermediate frequency band with a pass band selected to sharpen the bandwidth of signals while providing or without reducing coded content of the RF signals. The additional down converter provided by the mixer 50 and frequency synthesizer 56 operates to further down convert the RF signals to bring one intermediate frequency down to a lower intermediate frequency to facilitate processing with digital components. For example, frequency synthesizer 56 and mixer 50 are operable to down convert the L1 RF signals to 4 MHz or other intermediate frequency. The further band pass filter 52 operates to sharpen the bandwidth of signals while maintaining coded signal content at the lower intermediate frequency.

The signals from the common path 30 and the dedicated frequency path 20 are converted by the analog-to-digital converter 58. The analog-to-digital converter 58 is a single or a plurality of analog-to-digital converters. For example, separate analog-to-digital converters are provided for each of the frequency path 20 and the common path 30. The analog signals of the connected paths 30 and 20 are sampled and digital signals output on a bus, on a same path or separate paths to the correlator 60. In alternative embodiments, the analog signals of any of the paths 16, 18, 20, 30 are converted to digital signals at a different portion of the path, such as anywhere between the antenna 12 and the processor 62.

The sampled signals represent the coded information at the desired frequency band, such as L1, L2 and L5 signals. Since the L1, L2 and L5 signals are generated from a same clock in the same source, such as a satellite, the phase changes in L2 and L5 can be predicted over short intervals by a phase change in L1. In alternative embodiments, another of the signals is used as a primary signal for predicting phase changes in the other signals. Where no atmosphere interference is provided, tracking signals at one frequency, such as the L1 frequency, allows determination of the phase information at the other frequencies once an initial determination or relationship is made. A fixed phase relationship exists between the signals. Due to ionosphere changes being different for different frequencies, the phase relationship is updated occasionally, such as within every ten seconds. Since continuous tracking of the signals at each frequency may not be required, hardware cost may be reduced by sharing RF section components, such as the down converters on the common path 30. The time slots associated with the multiplexing by the multiplexer 28 establish the update rate of the phase relationship information of the signals on the common path 30 to the signals on the dedicated frequency path 20. The signals on the dedicated frequency path 20 are continuously tracked. The signals on the common path 30 are tracked on a continuous or intermittent basis. For example, a majority of the time, the L5 signals are positioned on the common path 30 for tracking in determining the phase relationship relative to the L1 signals. Occasionally, such as every five seconds or in response to a change in position, the L2 signals are placed on the common path 30 and the phase relationship is updated to solve for cycle ambiguity resolution.

The desired digital samples, such as from the common path 30 and the dedicated frequency path 20, are correlated by the correlator 60 for solving carrier or code phase ambiguity. The correlator 60 is a single or plurality of correlators. The correlator 60 comprises a digital signal processor, an application specific integrated circuit, transistors, switches, general processor, analog circuit, digital circuit, field programmable gate array, memory, buffer, combinations thereof or other now known or later developed devices for correlating signals. In one embodiment, the correlator 60 connects directly to the analog-to-digital converter 58, but may connect to other components of the paths 30 and 20 in alternative embodiments. The same correlator 60 may solve for the code or carrier phase information between three or more frequencies as a function of time, such as deriving the phase from radio frequency ranging signals at the L1 frequency in comparison to sequentially provided L2 and L5 information. The phase information is derived for different combinations of the signals as a function of time due to the difference in outputs on the common path 30 of different frequency information. In alternative embodiments, L5 or L2 signals are continuously tracked.

Any algorithm known in the art may be used for the correlation of the L1, L2 and L5 signals. Some of these algorithms are described in the paper titled 'Optimum semi-codeless carrier phase tracking of L2', presented by K. T. Woo at The 12$^{th}$ International Technical Meeting of the Satellite Division of the Institute of Navigation, Nashville, Tenn., Sep. 14-17, 1999. As the C/A code is known for the L1 RF signals, the L1 carrier and code signals may be separated with high-precision. Similarly, the L1 carrier and code signals may be separated with high-precision. The L2 signals may be correlated using the relationship between the phase of L1 or L5 signals and the phase of the L2 signals using any cross-correlation algorithm now known or later developed that reconstructs the L2 carrier. For military applications, the encryption code is known and the available decryption information is used to correlate the L2 RF signal with high-precision. The correlator 60 outputs an in-phase and a quadrature component of the sampled RF signal.

In one embodiment, the correlator 60 is a mode-switching field programmable gate array or software based correlator. Mode-switching allows for different unique correlation to be performed for different modes. For example, L5 will have a different modulation than L2, so the same unique correlator logic may not operate correctly for both signals. With an FPGA correlator, the correlator is reloaded with different logic when operation switches between L2 and L5. The correlator hardware (i.e., FPGA) is reloaded with different unique correlation logic for different phases of operation. A software based correlator 60 is a general processor that operates according to different unique correlation logic (e.g., different algorithms or code) for the different modes. When the correlation switches between the different signals, different code is executed. For the purpose of this embodiment, first and second "unique correlation logic" means two sets of correlation logic where one is not merely a simplified form of another. For example, the number of gates may be saved for one unique correlation logic as compared to another unique correlation logic. The logic is changed as opposed to merely changing a state of operation (i.e., setting some bits to 1 verses 1 and 0). Alternatively, different correlators are used for the different modulations or signals.

The correlated L1, L2 and L5 signals are output to the processor 62 for further processing. The output correlation signals vary over time as a function of the particular signals provided on the common path, such as correlated L1 and L5 signals being output for some, half or most of the time and correlated L1 and L2 signals output the rest of the time. Alternatively, correlated signals are output intermittently (i.e., some time slots not used by the common path 30 for either input frequencies).

The processor 62 is a general processor, digital signal processor, application specific integrated circuit, field programmable gate array, digital circuit, analog circuit, combinations thereof, or other now known or later developed devices for resolving carrier cycle ambiguities of one or more signals and determining a range, position, or other motion tracking parameter. The processor 62 runs standard loop closure algorithms as real-time tasks to track L1 code and carrier phases. The processor reconstructs the carrier phase of the secondary (common path) signals using the initial carrier phase of the secondary signal and the carrier phase of the dedicated path signal when the secondary signal is not available. For example, an initial carrier phase of L2 relative to L1 is determined. When L5 signals are provided on the common path, the initial carrier phase of the L2 signal and the current carrier phase of the L1 signal are used to determine a current or expected L2 phase.

The ambiguity is solved by extrapolating the carrier phase from the initial carrier phase using the fact that both signals are generated using the same clock in the satellite or other source. There is a constant frequency ratio between the signals at different frequencies. When the RF signals leave the satellite, the ratio of frequencies of primary and secondary frequency RF signals is equal to $f_2/f_1$. Due to ionospheric effects, this relation between the ratio of RF frequencies and $f_2/f_1$, is not exactly true when the antennas receive the RF signals. However, it is a very good approximation over several seconds (3-10 meters over an hour is a representative figure). The carrier phases of the signals on the dedicated frequency path 20 can be correlated and for the signals on the common path 30, the carrier phase can be extrapolated at any point of time with occasional verification by outputting the signal from the common path.

The processor 62 also uses the code and carrier phases to determine the position the antenna 12 using position tracking algorithms. The derived position is used to track the object. The position of the object may be output to an external user; it may also be used by any other method for further processing. After having resolved carrier cycle ambiguities, the processor obtains the position of the antennas using code and phase measurements for the primary frequency signal, such as the signal on the dedicated frequency path 20. The signals from the common path 30 are used to observe ionospheric delays and resolve the associated ambiguity. Thereafter, the processor 62 uses the position of the antenna 12 to track the object i.e. it finds the position, velocity, time, attitude and angular velocity associated with the object.

Figure 2:
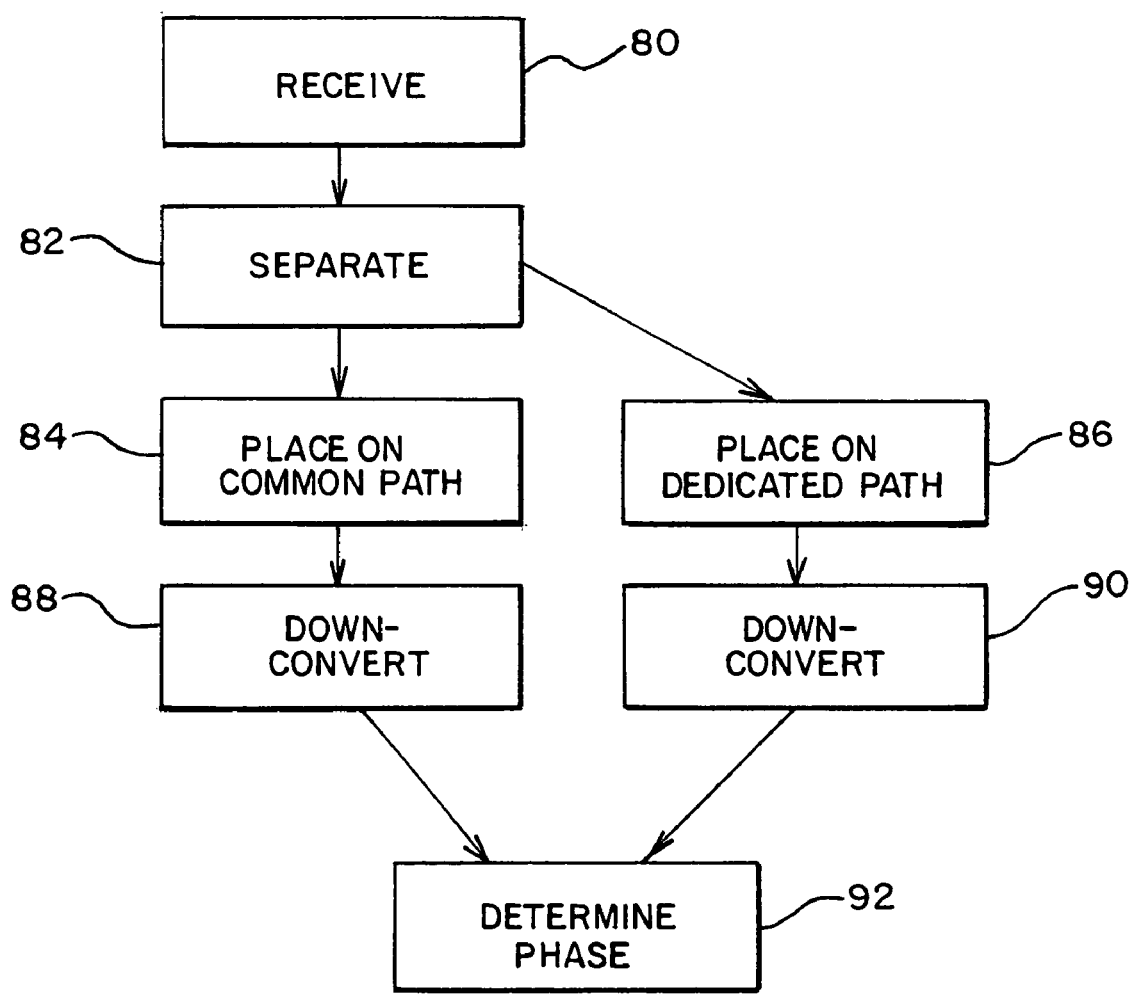
FIG. 2 is a flow chart diagram of one embodiment of a method for receiving signals to determine a range.

FIG. 2 shows one embodiment of a method for receiving ranging signals to determine a range or position. Additional, different or fewer acts may be provided. The method is implemented using the system of FIG. 1 or a different system. Radio frequency ranging signals, such as signals coded onto different carrier frequencies are processed, at least in part, using the same components. The resulting signals are used for determining a range or position parameter information.

In act 80, coded signals are received from a same source. For example, two or more coded signals at different carrier frequencies are received from a satellite, pseudolite or other source. In a global positioning system embodiment, coded signals at the L1, L2 and L5 carrier frequencies are received. The signals are received from a same source, such as a same satellite. Signals from a same source are generated in response to a same clock.

In act 82, the receive coded signals are separated as a function of the carrier frequency. For example, signals associated with each of the three GPS frequencies are separated. In one embodiment, separation is provided by band pass filtering, low pass filtering, high pass filtering, or combinations thereof. For example, band pass filtering is used to isolate signals at each of at least three different frequencies, such as the GPS frequencies, using filtering. In other embodiments, the receive antenna is frequency selective to isolate signals at a desired frequency band. In yet another alternative embodiment, the signals are separated as a function of time by altering a local oscillating signal for down conversion to an intermediate frequency followed by filtering. The frequency of the local oscillation signal is selected so the signals at the desired frequency band are shifted to the intermediate frequency for isolation by band pass filtering. Combinations of the different separating techniques discussed above may be used.

In act 84, the coded signals associated with at least two different carrier frequencies are placed on a common path. In one embodiment, the signals were never separated from the common path but are selected within the common path for placement as a function of time, such as selecting one frequency at one time and a different frequency at a different time. In an alternative embodiment, the signals from two different paths are then selected from placement on the common path, such as multiplexing the coded signals onto the common path as a function of time.

In act 88, the coded signals on the common path are down converted. For example, coded signals at two or more different carrier frequencies are down converted to a substantially same intermediate frequency at different times. The down conversion of signals at different frequencies is performed by generating different local oscillation signals at different times. Received ranging signals are mixed with the different local oscillation signals at different times. For example, the coded signals are provided in time slots. The local oscillation signals switch between possible frequencies as a function of the time slots. The coded signals at different carrier frequencies are then shifted to the same or substantially same intermediate frequency by altering the local oscillation signal applied to the mixers.

In a parallel or optional process, coded signals at a same or different carrier frequency are positioned on a parallel path to the common path or performed at a substantially same time as acts 84 and 88. In act 90, down conversion is performed on the coded signals of the parallel path. The intermediate frequency is the same or different than for the down conversion of act 88. The down conversion is constantly performed. In alternative embodiments, the down conversion is intermittently performed.

In act 92, at least one of a coding and carrier phase is determined for coded signals at each of the frequencies from the down-converted signals of act 88. For example, the code or carrier phase for the ranging signals of two or more carrier frequencies is determined at different times from the common intermediate frequency signal. The phase is determined by correlating signals associated with other carrier frequencies. For example, the substantially constantly provided signals from act 90 are correlated with the different signals output as a function of time from act 88. For a given carrier frequency, an actual phase correlation is provided for some time and for other times the code or carrier phase information is extrapolated. Since the common path shares the signals associated with two or more different carrier frequencies, the determination of the code or carrier phase for the intermediate frequency signals associated with each of the carrier frequencies occurs intermittently. The correlated code or carrier phase information is used for determining a range or position as discussed above.

In a further embodiment, the receiver 10 discussed above with respect to FIG. 1 and/or the method discussed above with respect to FIG. 2 are used for determining a position associated with a plurality of antennas. The same or similar structure is provided for each antenna. Each antenna is associated with a different satellite for determining a position, orientation or otherwise tracking motion. To further simplify hardware, a dedicated frequency path, such as the path 20, is provided for primary RF signals, such as L1 or L5, for each antenna. For other frequencies, such as L2 or L5 frequencies, hardware is shared between different antennas as well as between different frequencies associated with a same antenna. For example, the structure and processes disclosed in U.S. Pat. No. 7,138,944 (U.S. application Ser. No. 10/789,868 ), the disclosure of which is incorporated herein by reference, is used. The common path 30 is switched between antennas and frequencies associated with each antenna. A time slot is provided for each common frequency of each antenna. For example, a three antenna L1/L2/L5 receiver operates with four RF sections. Three RF sections are dedicated to each of the respective antennas and the primary frequency, such as the L1 frequency. The fourth RF section is a common path operable for all three different antennas and two different frequencies associated with each antenna (e.g., six different time slots).

In yet another alternative embodiment, frequencies other than the GPS frequencies are used. For example, Glownas, Iridium, Inmarsat or other bands could be used for different modes of operation.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A navigation receiver for determining a range from radio frequency ranging signals, the receiver comprising:
    at least two different signal paths each outputting a different frequency band of the radio frequency ranging signals; and
    a common signal path connected with outputs of the at least two different signal paths, the common signal path operable for at least first and second frequency bands of the at least two different signal paths;
a separate signal path operable for relatively continuous tracking for ranging signals at a third different frequency band; and
a processor operable to resolve carrier cycle ambiguities between at least two antennas with the ranging signals for the first, second, and third frequency bands, the processor operable to reconstruct the carrier phase of the ranging signals at the second frequency when the ranging signals at the second frequency are not on the common signal path.

2. The receiver of claim 1 wherein a first one of the at least two different signal paths comprises a first bandpass filter and a second one of the at least two different signal paths comprises a second bandpass filter having a different pass band than the first bandpass filter.

3. The receiver of claim 1 wherein the at least two different signal paths and the common signal path comprise analog signal paths.

4. The receiver of claim 1 wherein the common path comprises a down-converter, the down-converter operable in response to at least two different local oscillation signals.

5. The receiver of claim 1 further comprising:
a multiplexer operable to multiplex the outputs as a function of time onto the common signal path.

6. The receiver of claim 1 further comprising:
an antenna connected with the at least two different signal paths.

7. The receiver of claim 1 further comprising:
an analog-to-digital converter connected with the common signal path; and
a correlator connected with the analog-to-digital converter.

8. The receiver of claim 1 wherein the first, second and third different frequency bands of the radio frequency ranging signals are from a same source;
further comprising:
a multiplexer operable to multiplex the radio frequency ranging signals from the first and second signal paths onto the common path as a function of time; and
a correlator connected with the separate signal path and the common signal path, the correlator operable to correlate the radio frequency ranging signals from the separate signal path with the radio frequency ranging signals from the common signal path.

9. The receiver of claim 8 wherein the receiver is a global positioning receiver, the first signal path comprises a first bandpass filter having a first pass band for the L2 frequency, the second signal path comprises a second bandpass filter having a second pass band for one of the L1 and L5 frequencies, and the third signal path comprises third bandpass filter having a third pass band for the other of the L1 and L5 frequencies.

10. The receiver of claim 9 wherein the third signal path further comprises a first down-converter and the common signal path comprises a second down-converter operable in response to a first local oscillation signal for the L2 frequency and a second local oscillation signal for the one of the L1 and L5 frequencies.

11. A method for receiving signals to determine a range, the method comprising:
(a) filtering coded signals to obtain signals in at least two different frequency bands from a satellite;
(b) placing the at least two different frequency bands in an alternating sequence onto a common path;
wherein the two different frequency bands are first and second, different frequency bands:
further comprising:
(c) receiving coded signals at a third frequency band different than the first and second frequency bands from the satellite;
(d) placing the coded signals at the third frequency band on a path parallel to the common path;
(e) determining at least one of a code and carrier phase for the coded signals at the third frequency band, wherein (e) occurs substantially continuously and a measurement of the at least one of the code and carrier phase for the coded signals at the first and second frequency bands occurs intermittently for each of the coded signals at each of the first and second frequencies; and
(f) resolving carrier cycle ambiguities between at least two antennas with the ranging signals for the first, second and third frequency bands where the ranging signals are continuously provided for the first and sequentially provided for the second and third frequency bands.

12. The method of claim 11 wherein (a) comprises:
(a1) receiving the coded signals at both of the two different frequencies from a same satellite; and
(a2) filtering the coded signals with different pass bands.

13. The method of claim 11 further comprising:
(g) determining at least one of a code and carrier phase for the coded signals at each of the two frequencies.

14. The method of claim 13 wherein (g) comprises determining the at least one of the code and carrier phase for the coded signals at each of the two frequencies at different times.

15. The method of claim 11 wherein the first frequency band comprises L2 of the Global Positioning System (GPS), the second frequency band comprises either L1 or L5 of the GPS and the third frequency band comprises a different one of the L1 or L5 of the GPS.

16. The method of claim 11 further comprising:
(g) down-converting the coded signals at the at least two different frequencies to a substantially same intermediate frequency band.

17. The method of claim 16 further comprising:
(h) generating first and second different local oscillation signals at different times;
(i) mixing the coded signals of a first of the at least two different frequency bands with the first local oscillation signal at a first time; and
(j) mixing the coded signals of a second of the at least two different frequency bands with the second local oscillation signal at a second time, the first and second times corresponding to time slots of the coded signals at the first and second frequency bands on the common path.

18. The method of claim 11 wherein (f) comprises reconstructing a carrier phase of the ranging signals at the second frequency when the ranging signals at the third frequency are being provided.

19. A navigation receiver for determining a range from radio frequency ranging signals, the receiver comprising:
a correlator operable in at least first and second modes, the first mode using first correlation logic and the second mode using second correlation logic, where the first correlation logic is different than the second correlation logic in at least acting on different frequencies of the radio frequency ranging signals, the correlator operable to use the first and second modes intermittently for respective first and second ranging signals and operable regardless of the intermittent first and second modes to relatively continuously correlate for third ranging signals; and a processor operable to determine a phase relationship between the first and third ranging signals for the first mode and between the second and third ranging signals for the second mode, operable to solve for phase ambiguity as a function of the phase relationships, and operable to extrapolate carrier phase as a function of phase relationships.

20. The receiver of claim 19 wherein the correlator comprises a field programmable gate array and wherein the correlator reloads to switch between the first and second correlation logic.

21. The receiver of claim 19 wherein the correlator is a processor and wherein the correlator is operable to execute pursuant to the first and second correlation logic at different times.

22. The receiver of claim 19 further comprising:
a common path, the correlator connected with the common path;
wherein the correlator operates pursuant to the first correlation logic for signals from a first of at least two different paths and operates pursuant to the second correlation logic for signals from a second of the at least two different paths.

23. A method for receiving signals to determine a range, the method comprising:

(a) separating coded signals from a same satellite into at least three different frequency bands;

(b) operating a correlator with at least two different correlation logic modes at different times, a first correlation logic mode for a first of the at least three different frequency bands and a second correlation logic mode for a second of the at least three different frequency bands;

(c) extrapolating a first carrier phase of the signals at the first frequency band during the second correlation logic mode;

(d) resolving cycle ambiguities between two antennas as a function of the first carrier phase.

24. The method of claim 23 wherein (b) comprises reloading a field programmable gate array correlator.

25. The method of claim 23 wherein (b) comprises executing first and second different software by a processor at different times, the first software implementing the first correlation logic mode and the second software implementing the second correlation logic mode.

26. The method of claim 23 further comprising:
(d) placing the coded signals at the at least three different frequencies onto a common path;
wherein (b) comprises determining at least one of a code and carrier phase for the coded signals at two of the three frequencies at different times.

* * * * *